United States Patent
Hu et al.

(10) Patent No.: US 7,199,077 B2
(45) Date of Patent: Apr. 3, 2007

(54) FISCHER-TROPSCH CATALYST PREPARED WITH A HIGH PURITY IRON PRECURSOR

(75) Inventors: X. D Hu, Louisville, KY (US); Robert J. O'Brien, Louisville, KY (US); Richard Tuell, Elizabeth, IN (US); Esternio Conca, Novara (IT); Carlo Rubini, San Fermo della Battaglia (IT); Guido Petrini, Galliate (IT)

(73) Assignee: Sud-Chemie Inc., Louisville, KY (US)

( * ) Notice: Subject to any disclaimer, the term of this patent is extended or adjusted under 35 U.S.C. 154(b) by 274 days.

(21) Appl. No.: 10/343,935

(22) PCT Filed: May 15, 2002

(86) PCT No.: PCT/US02/15310

§ 371 (c)(1),
(2), (4) Date: May 29, 2003

(87) PCT Pub. No.: WO03/097236

PCT Pub. Date: Nov. 27, 2003

(65) Prior Publication Data

US 2004/0009871 A1 Jan. 15, 2004

(51) Int. Cl.
*B01J 31/00* (2006.01)
*B01J 37/00* (2006.01)
*B01J 23/00* (2006.01)
*B01J 23/70* (2006.01)
*C08F 4/00* (2006.01)

(52) U.S. Cl. ............ 502/325; 502/104; 502/105; 502/110; 502/113; 502/326; 502/328; 502/330; 502/331; 502/338

(58) Field of Classification Search .......... 502/104, 502/105, 110, 113, 325, 326, 328, 330, 331, 502/338

See application file for complete search history.

(56) References Cited

U.S. PATENT DOCUMENTS

| | | | | |
|---|---|---|---|---|
| 3,657,155 A | * | 4/1972 | Yoshino et al. | 502/249 |
| 3,748,119 A | * | 7/1973 | Hwang et al. | 75/349 |
| 3,965,046 A | * | 6/1976 | Deffeyes | 502/337 |
| 4,568,662 A | * | 2/1986 | Bialy et al. | 502/257 |
| 4,666,882 A | * | 5/1987 | Okazaki et al. | 502/338 |
| 4,677,084 A | * | 6/1987 | Bergna | 502/8 |
| 5,059,573 A | * | 10/1991 | Sasaki et al. | 502/205 |
| 5,536,693 A | * | 7/1996 | Lemanski et al. | 502/300 |
| 5,580,839 A | * | 12/1996 | Huffman et al. | 502/338 |
| 5,665,667 A | * | 9/1997 | Lemanski et al. | 502/300 |
| 5,783,726 A | * | 7/1998 | Lemanski et al. | 560/261 |
| 6,013,599 A | * | 1/2000 | Manson | 502/340 |
| 6,100,215 A | * | 8/2000 | Sasaki et al. | 502/201 |

* cited by examiner

*Primary Examiner*—Cam N. Nguyen
(74) *Attorney, Agent, or Firm*—Joan L. Simunic

(57) ABSTRACT

A Fischer-Tropsch catalyst comprising iron and at least one promoter is prepared via a method which comprises the preparation of a high purity iron precursor and which uses a nominal amount of water in the catalyst production. The catalyst particles prepared with the high purity iron precursor have an essentially spherical particle shape, a relatively narrow particle size distribution range, and a high surface area.

32 Claims, 2 Drawing Sheets

FISCHER-TROPSCH CATALYST PREPARED WITH A HIGH PURITY IRON PRECURSOR

BACKGROUND OF THE INVENTION

The present invention is for a method for producing a catalyst for use in the Fischer-Tropsch process, and the catalyst produced by the inventive method. The catalyst of the present invention comprises iron and at least one promoter. The catalyst is prepared via a method which comprises the preparation of a high purity iron precursor and which uses a nominal amount of water in the catalyst production. The catalyst particles prepared with the high purity iron precursor are essentially free of contaminants, and have essentially spherical particle shape and a relatively small particle size distribution range.

The Fischer-Tropsch synthesis involves the catalytic conversion of synthesis gas (a mixture of predominantly carbon monoxide and hydrogen) to a broad spectrum of saturated and unsaturated hydrocarbons ranging from methane to heavy wax. Oxygenates such as alcohols, ketones, aldehydes and carboxylic acids can also be synthesized by the Fischer-Tropsch synthesis. The first commercial Fischer-Tropsch catalysts were cobalt-based and were in use as early as 1935 in Germany. Early in the development of the Fischer-Trosch synthesis there was an interest in development of catalysts with metals less expensive than cobalt. Iron was an obvious choice; however, the commercial use of iron-based Fischer-Tropsch catalysts was not accomplished until the 1950's. Since that time iron-based Fischer-Tropsch catalysts have been successfully used in fixed-bed, fluidized-bed and slurry phase reactors on a commercial scale in South Africa by Sasol.

The activity and selectivity of iron-based Fischer-Tropsch catalysts are greatly improved by the addition of small amounts of promoters. The classic iron-based Fischer-Tropsch catalyst is promoted with copper and a group I metal, such as sodium, potassium, rubidium, cesium or a combination thereof Iron-based Fischer-Tropsch catalysts are active only when they have been reduced with hydrogen, carbon monoxide or synthesis gas. Copper has been found to significantly lower the reduction temperature of iron oxide and thus prevent sintering of the catalyst. Promotion with a Group I metal, such as potassium, lowers the acidity of the iron oxide and thereby decreases the selectivity to undesirable methane and increases alkene and wax selectivity. Group II metals may also be used; however, Group I metals are more effective promoters. Binders such as $SiO_2$ and $Al_2O_3$, can also be used to increase the structural integrity and life of iron-based catalysts; however, these generally are acidic and will result in an increase in methane selectivity.

There have been several methods used for the preparation of iron-based Fischer-Tropsch catalysts. The earliest catalysts, prepared by Fischer, were iron turnings treated with alkali. At high pressure, the liquid product was rich in oxygenated compounds, and at lower pressures hydrocarbons were produced. However, the iron-based catalysts prepared by this method deactivated rapidly.

The most common method of preparation of iron-based Fischer-Tropsch catalysts is precipitation. Typically a solution of an iron salt, such as ferric nitrate, is treated with a base, such as aqueous ammonia or sodium carbonate. The resulting iron oxyhydroxide precipitate is washed and filtered repeatedly to remove salts—ammonium nitrate or sodium nitrate—formed during the precipitation process. The washed filter cake is then dried and calcined. Promotion of the precipitated iron catalyst with copper and a Group I metal can be done at any time, before or after the drying and calcination steps. The final catalyst is usually composed of high surface area corundum phase iron oxide ($\alpha$-$Fe_2O_3$ or hematite).

Other types of iron based catalysts include, fused iron, supported iron and sintered iron. Fused iron catalysts are prepared by melting iron ore and one or more promoter such as $SiO_2$, $Al_2O_3$, CaO, MgO and $K_2O$. The resulting catalyst is usually composed predominantly of magnetite ($Fe_3O_4$) and has very low surface area. Active fused iron catalysts can only be achieved by reduction of the oxide to metalic iron with hydrogen. The reduced catalyst can have surface area up to about 10 to 15 $m^2/g$. Fused iron catalysts are characterized by high structural integrity and as such are well suited for fluid bed operations (Sasol); however, the relatively low surface area results in a Fischer-Tropsch catalyst with inferior activity as compared to typical precipitated iron catalysts. Supported iron catalysts are usually prepared by impregnating a solution of an iron salt onto a refractory metal oxide such as $Al_2O_3$, $SiO_2$, $TiO_2$ or $ZrO_2$. The impregnation can be carried out by incipient wetness techniques or by excess wetting followed by vacuum drying. Supported iron catalysts can have Fischer-Tropsch activity similar to precipitated iron catalysts on an iron mass basis; however, they are typically inferior on a catalyst volume basis. Supported iron catalysts inevitably suffer from the acidity of the metal oxide supports which increases the selectivity of undesirable methane.

Precipitated iron catalysts are generally regarded as superior Fischer-Tropsch catalysts to the other types of iron catalysts described herein. The major disadvantages of the manufacture of precipitated iron catalysts include high cost, the method is labor intensive, and the by-products are deleterious to the environment. Iron nitrate is the preferred iron source of precipitated iron catalysts because chloride and sulfur contamination from iron chloride or iron sulfate would have a deleterious affect on the activity of the resulting F-T catalyst. Iron nitrate is manufactured by the digestion of iron metal in nitric acid which produces nitrogen oxides that must be recovered by a scrubbing process. This necessary scrubbing step adds additional cost to the process. Further, the precipitation method tends to result in the formation of very viscous and gelatinous iron hydroxide or iron oxyhydrate precursor. This viscous precursor can be very difficult to form into spherical and attrition-resistant catalyst for fluid bed applications.

A process to produce iron-based Fischer-Tropsch catalysts that reduces or eliminates the washing and filtration steps and has minimal emissions to the environment would be favorable. A logical process from a commercial viewpoint would be to promote, form, dry and calcine a commercially available iron oxide that has high purity and high surface area. Commercial iron oxides are readily available; however, they are usually prepared by treatment of steel with hydrochloric acid or sulfuric acid. These iron oxides contain significant amounts of impurities including chloride and sulfur which makes them unusable as raw materials for Fischer-Tropsch catalysts. As is known in the art, the impurities of the commercial iron oxides (red or yellow iron oxides) can be reduced to very low level by the pickling process under very high temperatures. However, because of the extreme conditions of the pickling process, the surface area of the iron oxide is generally less than 10 $m^2/g$ making the iron oxide unsuitable for catalyst applications.

SUMMARY OF THE PRESENT INVENTION

A Fischer-Tropsch catalyst comprising iron and at least one promoter is prepared via a method which comprises the preparation of a high purity iron oxide from iron metal. The catalyst particles prepared with the high purity iron oxide are essentially free of contaminants, particularly halogens, nitrogen and sulfurs, and have an essentially spherical particle shape, a relatively narrow particle size distribution range, and surface areas of up to about 100 $m^2/g$—suitable for various catalyst applications.

The method comprises reacting iron metal with a mild organic acid and air in the presence of a minimal amount of water. The amount of water consumption in this invention is significantly less than that used in a conventional precipitation method and as a result, minimum or no waste water containing sulfate, nitrate or chloride is generated in this process. The resulting iron oxide slurry is then milled and promoters are added. The slurry is spray dried to form the finished catalyst. Because the process uses iron metal, the level of potential contaminants, such as sulfur and chlorine, can be kept to a minimum by starting with clean metal. Further, by starting with iron metal, there are no residual materials which need to be removed by washing the iron oxide filtrate so the amount of waste water is significantly lower than in prior art catalyst preparations. Additionally, because it is not necessary to wash and filter the slurry repeatedly, the production time is shorter than in prior art catalyst preparations.

DETAILED DESCRIPTION OF THE PREFERRED EMBODIMENTS

Figure 1:
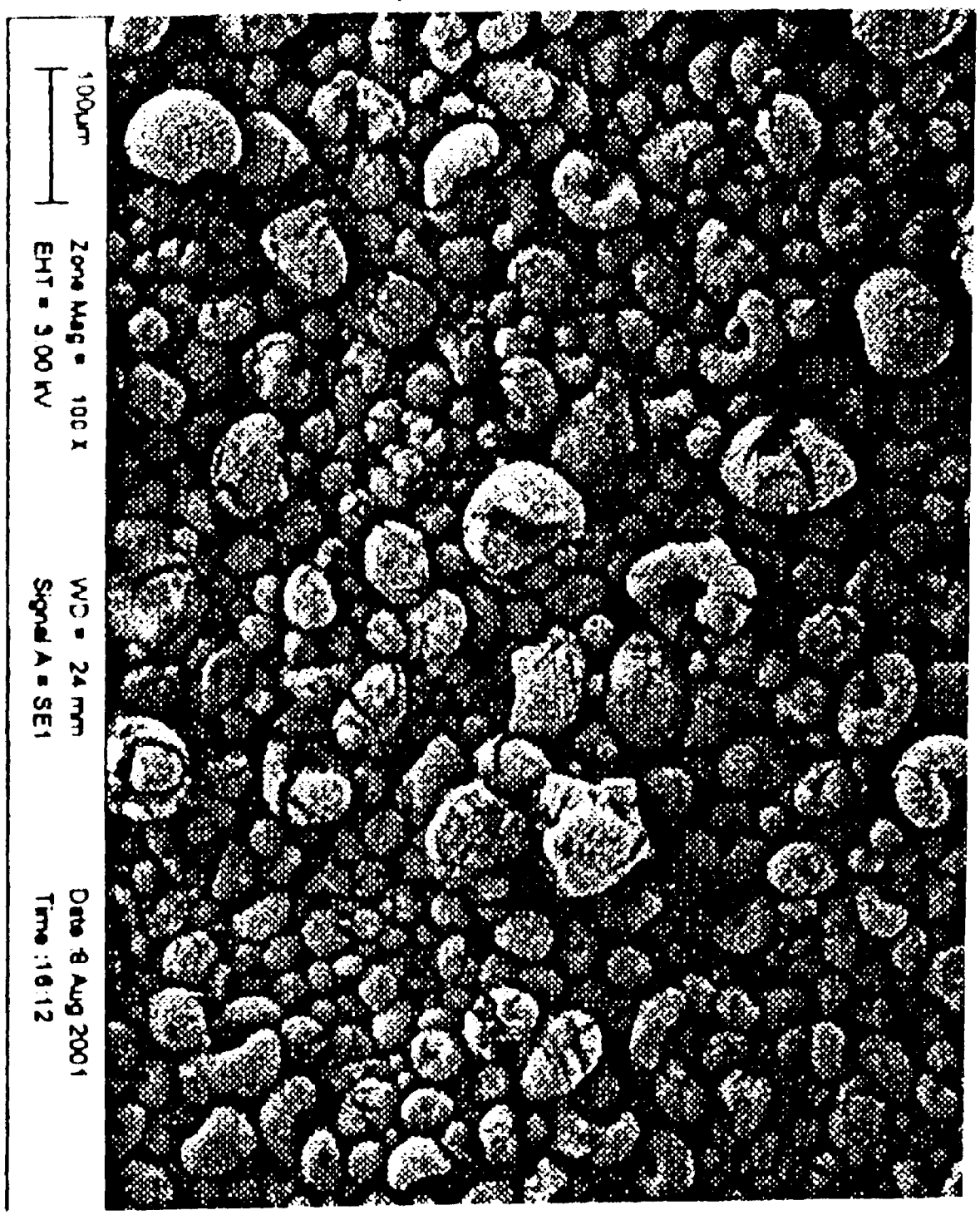
FIG. 1 is a secondary electron image of a scanning electron micrograph, magnification 100× (measured when the image is produced in a sheet of 8.5"×11" paper), of an catalyst comprising iron oxide, the catalyst being prepared by the prior art precipitation method as described in Example 1.

The catalyst of the present invention is intended for use in the Fischer-Tropsch (F-T) process. The catalyst composition is similar to F-T catalysts of the prior art and includes iron and at least one promoter. However, the process by which the catalyst is prepared is novel and the catalyst of the present invention includes fewer contaminants, such as sulfur and chlorine, and can be produced more efficiently than the prior art F-T catalysts.

The Fischer-Tropsch process is a surface-catalyzed polymerization process that converts synthesis gas (mixture of hydrogen gas and carbon monoxide) to hydrocarbons with a broad range of chain lengths and functionality. Typically, the catalysts used in the Fischer-Tropsch process include at least one metal that is an efficient carbon monoxide adsorber, and that is effective for hydrogenation reactions, such as iron, cobalt and nickel. Catalysts comprising iron or cobalt are preferred for the production of a spectrum of hydrocarbons; nickel-based catalysts tend to produce large quantities of methane; and ruthenium-based catalysts generate predominantly methane or high melting waxes, depending on the reaction conditions. The catalyst of the present invention comprises from about 35 wt % to about 70 wt % iron, based on the total catalyst weight, including the iron; and, in a more preferred embodiment, the catalyst comprises from about 56 wt % to about 70 wt % iron.

Fischer-Tropsch catalysts, particularly the iron catalysts, also commonly include at least one promoter which is added to improve selected properties of the catalyst or to modify the catalyst activity and/or selectivity. However, the addition of a promoter is not required to prepare the catalyst particles having an essentially spherical shape and a relatively narrow particle size distribution. For iron-based catalysts, the prior art teaches that copper, the alkali metals and the alkaline earth metals, such as sodium, potassium, rubidium, cesium, magnesium, calcium, strontium, barium and combinations thereof, are effective promoters. Other metals may be substituted as desired by the user to modify the catalyst properties or to modify the catalyst's activity and/or selectivity. For example, Fischer-Tropsch catalysts have been prepared with promoters selected from the group consisting of boron, cerium, chromium, copper, iridium, iron, lanthanum, manganese, molybdenum, palladium, platinum, rhenium, rhodium, ruthenium, strontium, tungsten, vanadium, zinc, sodium oxide, potassium oxide, rubidium oxide, cesium oxide, magnesium oxide, titanium oxide, zirconium oxide, and other rare earth metals, such as scandium, yttrium, praseodymium, neodymium, promethium, samarium, europium, gadolinium, terbium, dysprosium, holmium, erbium, thulium, ytterbium, lutetium, and combinations thereof. The promoters are generally added in smaller concentrations than the iron, and in the present invention, the promoters preferably comprise from about 0.002 wt % to about 40 wt %, and more preferably comprises from about 0.01 wt % to about 1 wt % of the total catalyst weight.

The physical structure of the Fischer-Tropsch catalyst also affects the catalyst activity and, as is known in the art, selecting the proper catalyst design for a particular type of reactor can translate to relatively high production rates and relatively low maintenance costs for a commercial producer. The catalyst's structural or mechanical properties, including particle strength and attrition resistance, depend on the chemical stability of the catalyst and are affected by the catalyst particle's size and shape. The catalyst particle's shape and size also can affect properties such as flow distribution and pressure drop.

In the present invention, although the catalyst composition is similar to that of Fischer-Tropsch catalysts of the prior art, the process by which the catalyst is prepared results in a catalyst which is essentially free of contaminants, and which has an essentially spherical particle shape, a relatively narrow particle size distribution range, and a high surface area. Broadly presented, the process for preparing a preferred embodiment of the catalyst of the present invention includes directly treating iron metal with a mild organic acid and air to form an iron oxide slurry, then intensively milling the slurry to a small micron size, then adding one or more promoters to the slurry, and then spray drying the slurry with a wheel atomizer. Water is added to the process only as needed to allow for mixing of the materials. (As used herein, the term "contaminants" refers to elements or compounds which are known in the art to deleteriously affect the performance of the Fischer-Tropsch catalyst. Some commonly recognized contaminants are sulfur and chlorine.)

More specifically, to prepare the Fischer-Tropsch catalyst of the present invention, iron metal is reacted with a mild organic acid in aqueous media at ambient conditions, and the mixture is then aerated. The iron metal may be a powder, granule, sphere, chip or other form having an average diameter of from about 1μ to about 500μ. In one embodiment, the iron metal is in micro-spheroidal form with an average diameter of from about 40μ to about 150μ. Further, the iron metal should be essentially contaminant-free, although traces of carbon, manganese, nickel, copper, silicon and combinations thereof, may be present. (As used herein, "traces" is defined as less than about 1.5 wt % for all the elements combined.) The organic acid is preferably a carboxylic acid having at least one carboxylic acid group with a $pK_a$ at ambient temperature of from about 0.5 to about 6. For example, formic acid, acetic acid, glycolic acid, oxalic acid, pyruvic acid, malonic acid and propionic acid may be used in the reaction.

The organic acid is added to deionized water with agitation to form an acid solution. At ambient temperature and while maintaining the agitation or mixing, the iron metal is slowly added to the acid solution. As the iron reacts with the acid, the reaction temperature increases, but the rate of addition should be sufficiently slow that the temperature does not exceed about 100° F. It is believed that when iron metal is added to the organic acid solution, the iron is oxidized by the acid and hydrogen gas ($H_2$) is produced. The hydrogen gas can be diluted in a vent with air to a concentration of less than about 4%, i.e. below the explosion limit, or it can be sent to an after-burner to recover the heat for use in drying or calcination.

After the iron metal is mixed into the acid solution, an additional oxidizing agent, such as air, compressed air, oxygen, hydrogen peroxide, an organic peroxide, ozone or a combination thereof, is added to the solution. In one embodiment the oxidizing agent is compressed air which is forced through the solution via a stainless steel air sparger mounted within a mix tank, however, a variety of other means as are known in the art may be used to bubble air through the iron/acid solution. The air flow is continued and the reaction temperature is held at less than about 100° F. until essentially all the free iron is consumed and an iron slurry is formed. The slurry is believed to comprise iron oxide hydrate, iron oxide, iron hydroxide, iron oxyhydroxide or a combination thereof. Total iron consumption time can range from about 24 hours to about 48 hours, or longer depending on the iron source. During the course of the reaction, the slurry color changes from gray to brown. Typically, the color change will be evident from about 45 minutes to about 6 hours after the air flow is started. Unreacted iron can be detected by X-ray diffraction patterns.

The iron slurry is milled to a small particle size, such as a median particle size of less than about 40 microns, preferably a particle size of less than about 10 microns. In the examples presented herein, a Netzsch mill with SEPR, ER 120A 0.8/1.25 mm ceramic beads is used. However, several different milling techniques are known in the art and may be used in place of the Netzsch mill.

The iron content in the slurry is determined using standard techniques known in the art, and promoters are added to the slurry. The specific promoters added and concentration at which the promoters are added can vary depending on the application. If the promoters are added as crystals, the crystals may be dissolved in a small amount of water before addition to the slurry. After the addition of the promoters, the product slurry should have a solids content of from about 10% to about 40%.

The slurry is then spray dried with a wheel atomizer. The inlet temperature is set to about 500° F., and the outlet temperature is maintained at about 300° F. A median particle size of from about 50 microns to 80 microns (wheel speed of about 13,000 rpm) is preferred. After spray drying, the surface area of the catalyst is from about 10 $m^2/g$ to about 40 $m^2/g$. The spray dried catalyst is then calcined and screened to remove large particles. After calcining in a box furnace set at about 662° F. for about 4 hours, the catalyst has a surface area of from about 10 $m^2/g$ to about 80 $m^2/g$. The spray dried catalyst has an essentially spherical shape.

The following examples illustrate and explain the present invention, but are not to be taken as limiting the present invention in any regard. Example 1 describes the preparation of a Fischer-Tropsch catalyst using a conventional precipitation method. Examples 2–8 describe preparations of Fischer-Tropsch catalysts using the minimal effluent method in accordance with the present invention.

EXAMPLE 1

A comparative sample of a Fischer-Trospch catalyst is prepared by a prior art Precipitation method as follows:

About 30 pounds of iron oxide is produced by adding about 133.55 kg of iron nitrate solution (7% Fe (w/w); commercially available from Shepherd Chemical, Cincinnati, Ohio) to a 45 gallon stainless steel tank. Deionized water is added until the total volume is about 42 gallons. The iron nitrate solution is thoroughly mixed.

The iron nitrate solution is then fed at a feed rate of about 890 cc/min into an about 8 liter stainless steel precipitation tank with hole cut at about the 6.5 liter level. Essentially concurrently an aqueous ammonia solution (29% w/w) is fed at an initial feed rate of about 400 cc/min into the precipitation tank. The combined solutions have a residence time of about 5 minutes in the precipitation vessel. The solution in the precipitation vessel is mixed with a high shear mixer, and the aqueous ammonia solution feed rate is adjusted such that the combined solution in the precipitation vessel has a pH of about 10.0. A slurry forms and is allowed to overflow from the precipitation vessel into a stainless steel overflow tank (having a capacity of about 110 gallons) where it continues to be mixed. When the iron nitrate solution is consumed, the aqua ammonia solution flow is discontinued, and about 50 gallons of slurry is present in the overflow tank.

The slurry is filtered through a filter press to form a filtrate, and the conductivity of the filtrate is measured, using standard techniques known in the art. The filtrate or filter cake is treated with air until firm. The filter cake is loaded into a stainless steel tank having a capacity of about 110 gallons and about 36 gallons of deionized water is added. The filter cake and water are thoroughly mixed and the filtration process is repeated. The washing and filtration steps are repeated until the filtrate has conductivity of about 300 μS. (This may require, for example, about 7 washings and 8 filtrations.)

The iron content in the slurry is determined using standard techniques known in the art, and promoters are added to the slurry. Per about 100 g iron in the slurry, $Cu(NO_3)_2 \cdot 2\frac{1}{2}H_2O$ crystals (commercially available from Aldrich, Milwaukee, Wis.) or $Cu(NO_3)_2$ solution (28% Cu, w/v (SCI plant material) is added to deliver about 0.5 g copper and potassium nitrate (commercially available from Aldrich, Milwaukee, Wis.) is added to deliver about 0.2 g $K_2O$. If the promoters are added as crystals, the crystals may be dissolved in a minimal amount of water before addition to the slurry.

The slurry is then spray dried with a wheel atomizer (APV Anhydro Spray Drier). The inlet temperature is set to about 500° F., and the outlet temperature is maintained at about 300° F. A median particle size of 50 to 60 microns (13,000 rpm) is preferred. The spray dried catalyst is then calcined at about 662° F. for 4 hours in a box furnace. About 20 pounds of catalyst is produced.

EXAMPLE 2

A sample of a Fischer-Trospch catalyst is prepared by the comparative method presented in Example 1 except that after the washing and filtration steps, about 25 cc of nitric acid is then added to about 25 pounds of the filter cake and mixed thoroughly so that the filter cake becomes fluid with agitation. Water may be added as necessary to facilitate mixing. The solids content of the solution should be at from about 15% to about 20%. The iron content is then determined, the promoters are added, and the slurry is spray-dried as in Example 1.

EXAMPLE 3

A sample of a Fischer-Trospch catalyst is prepared by the comparative method presented in Example 1 except that after the washing and filtration steps, the product is milled through a Netzsch mill with SEPR, ER 120A 0.8/1.25 mm ceramic beads to a median particle size of less than about 2 μm. The iron content is then determined, the promoters are added, and the slurry is spray-dried as in Example 1.

EXAMPLE 4

A sample of a Fischer-Trospch catalyst is prepared by the comparative method presented in Example 2 except that after the nitric acid is added, the product is milled through a Netzsch mill with SEPR, ER 120A 0.8/1.25 mm ceramic beads to a median particle size of less than about 2 μm.

EXAMPLE 5

A sample of a Fischer-Trospch catalyst is prepared by the inventive method presented herein as follows:

A stainless steel air sparger is fitted into the bottom of a 50 gallon Nalgene drum. About 36 gallons of deionized water and about 16.5 pounds of formic acid (90%, commercially available through Specialty Chemical Co. LCC, Cleveland, Tenn., USA) is added to the drum and thoroughly mixed. About 40 pounds of iron powder (commercially available from Pyron, Niagara Falls, N.Y., USA and designated by product code AC-325) is added to the formic acid solution with mixing. The iron powder is added slowly enough to maintain a reaction temperature of less than about 100° F.

After the iron powder is added and a slurry has formed, compressed air is passed through the sparger. The air flow is continued and the reaction temperature is held at about 100° F. until essentially all the free iron is consumed, or for about 24 hours. Unreacted iron can be detected by XRD.

The iron slurry is milled through a Netzsch mill with SEPR, ER 120A 0.8/1.25 mm ceramic beads to a median particle size of less than about 2 μm. The iron content in the slurry is determined using standard techniques known in the art, and promoters are added to the slurry. Per about 100 g iron in the slurry, $Cu(NO_3)_2 \cdot 2\frac{1}{2}H_2O$ crystals (commercially available from Aldrich, Milwaukee, Wis.) or $Cu(NO_3)_2$ solution (28% Cu, w/v (SCI plant material) is added to deliver about 0.5 g copper and potassium nitrate (commercially available from Aldrich, Milwaukee, Wis.) is added to deliver about 0.2 g $K_2O$. If the promoters are added as crystals, the crystals may be dissolved in a minimal amount of water before addition to the slurry.

The slurry is then spray dried with a wheel atomizer (APV Anhydro Spray Drier). The inlet temperature is set to about 500° F., and the outlet temperature is maintained at about 300° F. A median particle size of 50 to 60 microns (13,000 rpm) is preferred. The spray dried catalyst is then calcined at about 662° F. for 4 hours in a box furnace, and is screened to remove large particles (−100 or −60 mesh). About 40 pounds of catalyst is produced.

EXAMPLE 6

A sample of a Fischer-Trospch catalyst is prepared by the inventive method presented in Example 5 except the iron powder AC-325 is replaced by Höganäs AB (Höganäs, Sweden) ASC-300, and the aeration time is increased to about 48 hours.

EXAMPLE 7

A sample of a Fischer-Trospch catalyst is prepared by the inventive method presented in Example 5 except the iron powder AC-325 is replaced by Höganäs ASC-300, and the aeration time is increased to about 48 hours.

EXAMPLE 8

A sample of a Fischer-Trospch catalyst is prepared by the inventive method presented in Example 5 except the formic acid is replaced by acetic acid, and the aeration time is increased to about 30 hours.

EXAMPLE 9

A sample of a Fischer-Trospch catalyst is prepared by the inventive method presented in Example 5 except the formic acid is replaced by oxalic acid, and the aeration time is increased to about 36 hours.

EXAMPLE 10

A sample of a Fischer-Trospch catalyst is prepared by the inventive method presented in Example 5 except the formic acid is replaced by pyruvic acid, and the aeration time is increased to about 36 hours.

EXAMPLE 11

A sample of a Fischer-Trospch catalyst is prepared by the inventive method presented in Example 5 except the formic acid is replaced by glycolic acid, and the aeration time is increased to about 32 hours.

EXAMPLE 12

A sample of a Fischer-Trospch catalyst is prepared by the inventive method presented in Example 5 except the formic acid is replaced by propionic acid, and the aeration time is increased to about 37 hours.

As previously noted, the amount of water used in the present invention is significantly less than the amount used in a conventional precipitation method. This can be demonstrated by comparing, for example, the amount of water used in Example 4 (precipitation method) and Example 5 (inventive method). As shown in Table I, to prepare the catalyst by the method of Example 4 requires a water input of about 4836 pounds. To prepare the catalyst by the method of Example 5 requires about 300 pounds of water, or about 16 times less water than is used in the method of Example 4.

TABLE I

| | Example 4 | | | Example 5 | | |
|---|---|---|---|---|---|---|
| Input | lbs | lb moles | Input | lbs | lb moles |
| ferric nitrate Fe(NO$_3$)$_3$ | 173.20 | 0.72 | iron (Fe) | 40.00 | 0.72 |
| ammonia source (NH$_4$OH) | 71.56 | 2.04 | formic acid (CH$_2$O$_2$) | 16.50 | 0.36 |
| dilution water (H$_2$O) | 835.77 | 46.43 | water (H$_2$O) | 299.77 | 16.65 |
| washing water (H$_2$O) | 4000.26 | 222.24 | oxygen (O$_2$) | 17.19 | 1.07 |
| nitric acid (HNO$_3$) | 0.54 | 0.01 | | | |
| Total | 5081.33 | 271.44 | Total | 373.46 | 18.80 |
| Output | lbs | lb moles | Output | lbs | lb moles |
| iron oxide (Fe$_2$O$_3$) | 57.19 | 0.72 | iron oxide (Fe$_2$O$_3$) | 57.19 | 0.72 |
| ammonia nitrate (NH$_4$NO$_3$) | 163.57 | 2.04 | waste water (H$_2$O) | 0.00 | 0.00 |
| waste water (H$_2$O) | 4594.86 | 255.27 | water vapor (H$_2$O) | 299.77 | 16.65 |
| water vapor (H$_2$O) | 260.54 | 14.47 | hydrogen (H$_2$) | 0.72 | 0.36 |
| NO$_2$ | 5.17 | 0.11 | CO$_2$ | 15.78 | 0.36 |
| Total | 5081.33 | 272.62 | Total | 373.46 | 18.09 |
| Total input H$_2$O usage | 4836.03 | 268.67 | Total input H$_2$O usage | 299.77 | 16.65 |
| Total H$_2$O output | 4855.40 | 269.40 | Total H$_2$O output | 299.77 | 16.65 |

Further, because the inventive method requires less water as input to the process than the precipitation method, significantly less waste water is generated. For example, Example 5 generates 299.77 pounds of waste water as compared to Example 4 which generates 4855 pounds of waste water. Moreover the waste water of the present invention is cleaner, that is it contains essentially no sulfates, nitrates, or chlorides.

Figure 2:
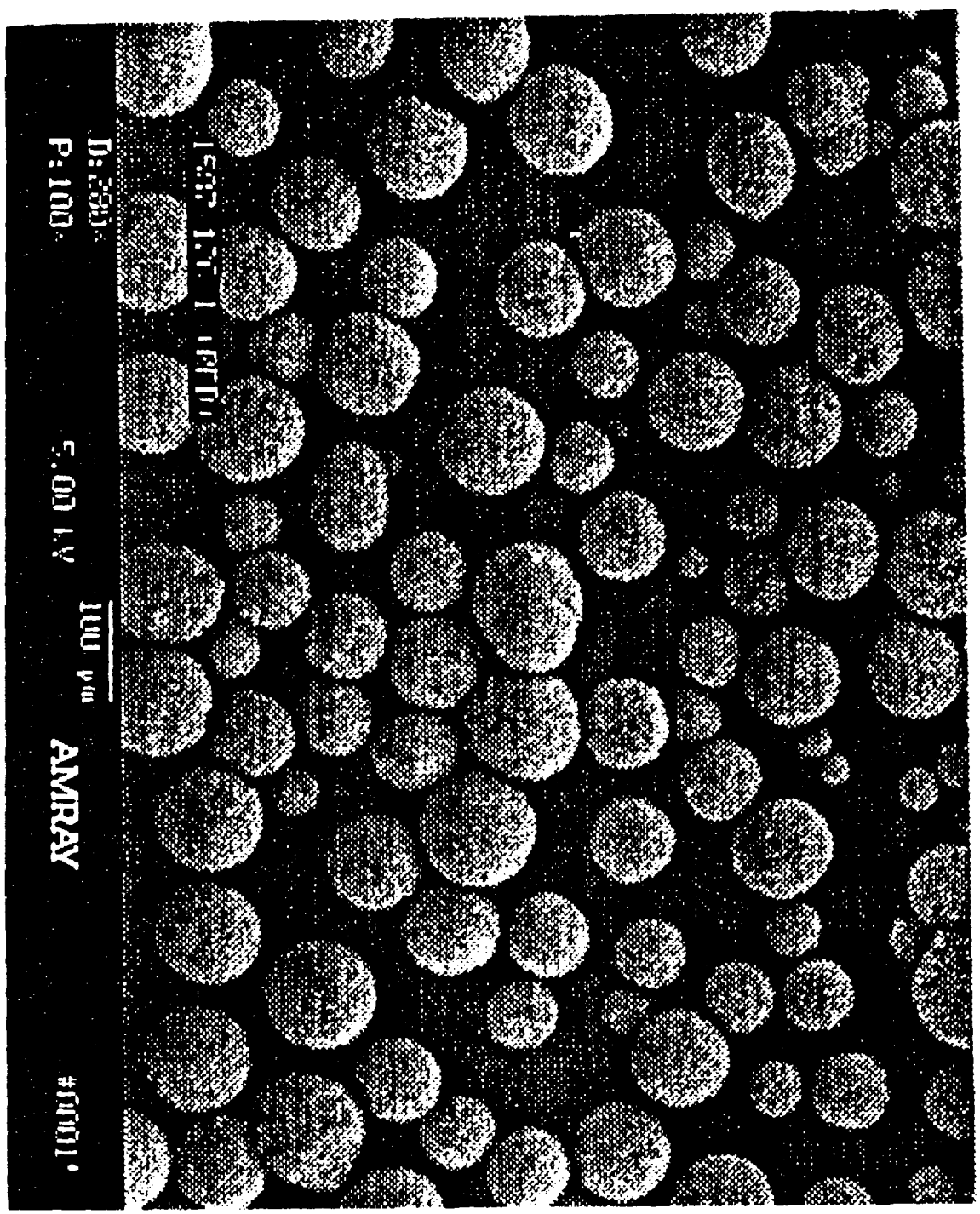
FIG. 2 is a secondary electron image of a scanning electron micrograph, magnification 100× (measured when the image is produced in a sheet of 8.5"×11" paper), of an catalyst comprising iron oxide, the catalyst being prepared by the method in accordance with the present development as described in Example 2.

FIGS. 1 and 2 are scanning electron micrographs of catalyst prepared as described in Examples 1 and 6, respectively. As is known in the art, the particle shape can affect physical properties of the catalyst, such as the particle strength and the attrition resistance. Spherical particles tend to have greater particle strength and are more attrition resistant than non-spherical particles. The particle size can affect the catalyst properties such as flow distribution and pressure drop, and for commercial operations particles within a relatively narrow range are preferred. As shown in FIG. 2, the catalyst prepared from iron powder has an essentially spherical shape and has a relatively narrow particle size distribution range. By comparison, as shown in FIG. 1, the catalyst prepared by the prior art precipitation method has varied shapes and particle sizes.

The catalyst of the present invention is intended for use in the Fischer-Tropsch process and has a composition is similar to F-T catalysts of the prior art. However, the process by which the catalyst is prepared uses less water, generates less waste water, is more efficient, and produces a finished product essentially free from contaminants and having an essentially spherical particle shape and relatively small particle size distribution range. It is understood that the composition of the catalyst and the specific processing conditions may be varied without exceeding the scope of this development.

The invention claimed is:

1. A method of making a catalyst for the conversion of at least one component of synthesis gas, said method comprising:
   a) preparing an aqueous organic acid solution from a carboxylic acid and water;
   b) adding iron metal to said acid solution;
   c) forcing an oxidizing agent through said acid solution until said iron metal is consumed and an iron slurry is formed;
   d) milling said iron slurry to a median particle size of less than about 2 microns;
   e) adding at least one promoter to said milled iron slurry to form a product slurry; said promoter being added at a concentration such that said product slurry has a solids content of from about 10% to about 40% inclusive of said promoter;
   f) spray drying said slurry to form particles; and
   g) calcining said particles to form said catalyst.

2. The method of claim 1 wherein said carboxylic acid has at least one carboxylic acid group with a pK$_a$ at ambient temperature of from about 0.5 to about 6.

3. The method of claim 1 wherein said carboxylic acid is selected from the group consisting of formic acid, acetic acid, glycolic acid, oxalic acid, pyruvic acid, malonic acid and propionic acid, and combinations thereof.

4. The method of claim 1 wherein said iron metal is a powder, granule, sphere, chip or other form having an average diameter of from about 1µ to about 500µ.

5. The method of claim 1 wherein said promoter is selected from the group consisting of copper, an alkali metal, an alkaline earth metal, and combinations thereof.

6. The method of claim 5 wherein said alkali metal is selected from the group consisting of sodium, potassium, rubidium, cesium and combinations thereof.

7. The method of claim 5 wherein said alkaline earth metal is selected from the group consisting of magnesium, calcium, strontium, barium and combinations thereof.

8. The method of claim 1 wherein said slimy is spray dried with a wheel atomizer.

9. The method of claim 1 wherein said catalyst comprises from about 35 wt % to about 70 wt % iron and from about 0.002 wt % to about 40 wt % of a promoter.

10. The method of claim 9 wherein said catalyst has an essentially spherical particle shape and relatively small particle size distribution range.

11. The method of claim 1 wherein said oxidizing agent is selected from the group consisting of air, compressed air, oxygen, hydrogen peroxide, an organic peroxide, ozone and combinations thereof.

12. A method of making a catalyst for the conversion of at least one component of synthesis gas, said method consisting essentially of the steps:
 a) preparing an essentially contaminant-free iron slurry by reacting an iron source with an aqueous organic acid solution and an oxidizing agent, wherein said organic acid solution is prepared from water and a carboxylic acid;
 b) milling said iron slurry to a median particle size of less than about 2 microns;
 c) adding at least one promoter to said milled iron slurry to form a product slurry;
 d) spray drying said slurry to form particles; and
 e) calcining said particles to form said catalyst.

13. The method of claim 12 wherein said slurry is spray dried with a wheel atomizer.

14. The method of claim 12 wherein said product slurry has a solids content of from about 10% to about 40%.

15. The method of claim 12 wherein said catalyst comprises from about 35 wt % to about 70 wt % iron and from about 0.002 wt % to about 40 wt % of a promoter.

16. The method of claim 12 wherein said catalyst has an essentially spherical particle shape and relatively small particle size distribution range.

17. The method of claim 12 wherein said iron source is an iron metal powder, granule, sphere, chip or other form having an average diameter of from about $1\mu$ to about $500\mu$.

18. The method of claim 12 wherein said organic acid solution is prepared from water and a carboxylic acid having at least one carboxylic acid group with a $pK_a$ at ambient temperature of from about 0.5 to about 6.

19. The method of claim 12 wherein said organic acid solution is prepared from water and an acid, wherein said acid is selected from the group consisting of formic acid, acetic acid, glycolic acid, oxalic acid, pyruvic acid, malonic acid and propionic acid, and combinations thereof.

20. The method of claim 12 wherein said oxidizing agent is selected from the group consisting of air, compressed air, oxygen, hydrogen peroxide, an organic peroxide, ozone and combinations thereof.

21. The method of claim 12 wherein said promoter is selected from the group consisting of copper, an alkali metal, an alkaline earth metal, and combinations thereof.

22. The method of claim 12 wherein said promoter is selected from the group consisting of copper, sodium, potassium, rubidium, cesium, magnesium, calcium, strontium, barium and combinations thereof.

23. A method of making a catalyst for the conversion of at least one component of synthesis gas, said method consisting, essentially of the steps:
 a) preparing an essentially contaminant-free iron slurry reacting an iron source with an aqueous organic acid solution and an oxidizing agent, wherein said organic acid solution is prepared from water and a carboxylic acid;
 b) milling said iron slurry to a median particle size of less than about 2 microns;
 c) spray drying said milled slurry to form particles; and
 d) calcining said particles to form said catalyst.

24. The method of claim 23 wherein said milled slurry is spray dried with a wheel atomizer.

25. The method of claim 23 wherein said iron slurry has a solids content of from about 10% to about 40%.

26. The method of claim 23 wherein said essentially contaminant-free iron slurry is prepared by reacting an iron source with an aqueous organic acid solution and an oxidizing agent and then adding at least one promoter.

27. The method of claim 26 wherein said iron source is an iron metal powder, granule, sphere, chip or other form having an average diameter of from about $1\mu$ about $500\mu$.

28. The method of claim 27 wherein said organic acid solution is prepared from water and an acid, wherein said acid is selected from the group consisting of formic acid, acetic acid, glycolic acid, oxalic acid, pyruvic acid, malonic acid and propionic acid, and combinations thereof.

29. The method of claim 26 wherein said oxidizing agent is selected from the group consisting of air, compressed air, oxygen, hydrogen peroxide, an organic peroxide, ozone and combinations thereof.

30. The method of claim 26 wherein said promoter is selected from the group consisting of copper, sodium, potassium, rubidium, cesium, magnesium, calcium, strontium, barium and combinations thereof.

31. The method of claim 23 wherein said essentially contaminant-free iron slurry is prepared by reacting an essentially contaminant-free iron oxide with at least one promoter.

32. The method of claim 31 wherein said promoter is selected from the group consisting of copper, sodium, potassium, rubidium, cesium, magnesium, calcium, strontium, barium and combinations thereof.

* * * * *